United States Patent [19]

Uchiyama et al.

[11] 4,238,149
[45] Dec. 9, 1980

[54] FLASH CAMERA SYSTEM WITH DAYLIGHT CUTOUT CONTROL

[75] Inventors: Takashi Uchiyama; Shohei Ohtaki, both of Yokohama; Zenzo Nakamura, Urawa; Tokuichi Tsunekawa; Tadashi Ito, both of Yokohama; Hiroshi Aizawa, Kawasaki, all of Japan

[73] Assignee: Canon Kabushiki Kaisha, Tokyo, Japan

[21] Appl. No.: 928,791

[22] Filed: Jul. 28, 1978

Related U.S. Application Data

[63] Continuation of Ser. No. 764,739, Feb. 1, 1977, abandoned.

[30] Foreign Application Priority Data

Feb. 5, 1976 [JP] Japan ................................. 51-11689

[51] Int. Cl.³ .............................................. G03B 15/05
[52] U.S. Cl. .................................. 354/128; 354/149; 354/234

[58] Field of Search .............................. 354/27, 32-35, 354/60 F, 126-130, 133, 137, 138, 139, 145-147, 149, 256, 258-260, 266, 267, 51, 50, 234, 235

[56] References Cited

U.S. PATENT DOCUMENTS

| 2,930,298 | 3/1960 | Suzukawa | 354/146 X |
| 3,529,526 | 9/1970 | Wick et al. | 354/147 |
| 4,016,575 | 4/1977 | Ochiyama et al. | 354/33 |

Primary Examiner—George H. Miller, Jr.
Assistant Examiner—William B. Perkey
Attorney, Agent, or Firm—Toren, McGeady and Stanger

[57] ABSTRACT

A shutter control circuit which normally responds to ambient light switches automatically to a flash mode in response to a charge signal from a flash unit. The light flash eliminates the charge signal. To prevent the absence of a charge signal from returning the shutter to daylight control, a shutter closing signal is generated before a flash synchronizing contact is closed and hence before the charge signal ends. However shutter closing action is then started only after a delay that provides time for the flash to occur when the shutter is fully open.

7 Claims, 5 Drawing Figures

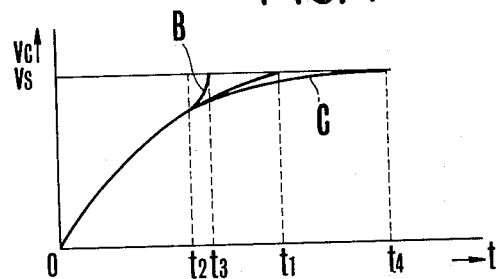
FIG. 1
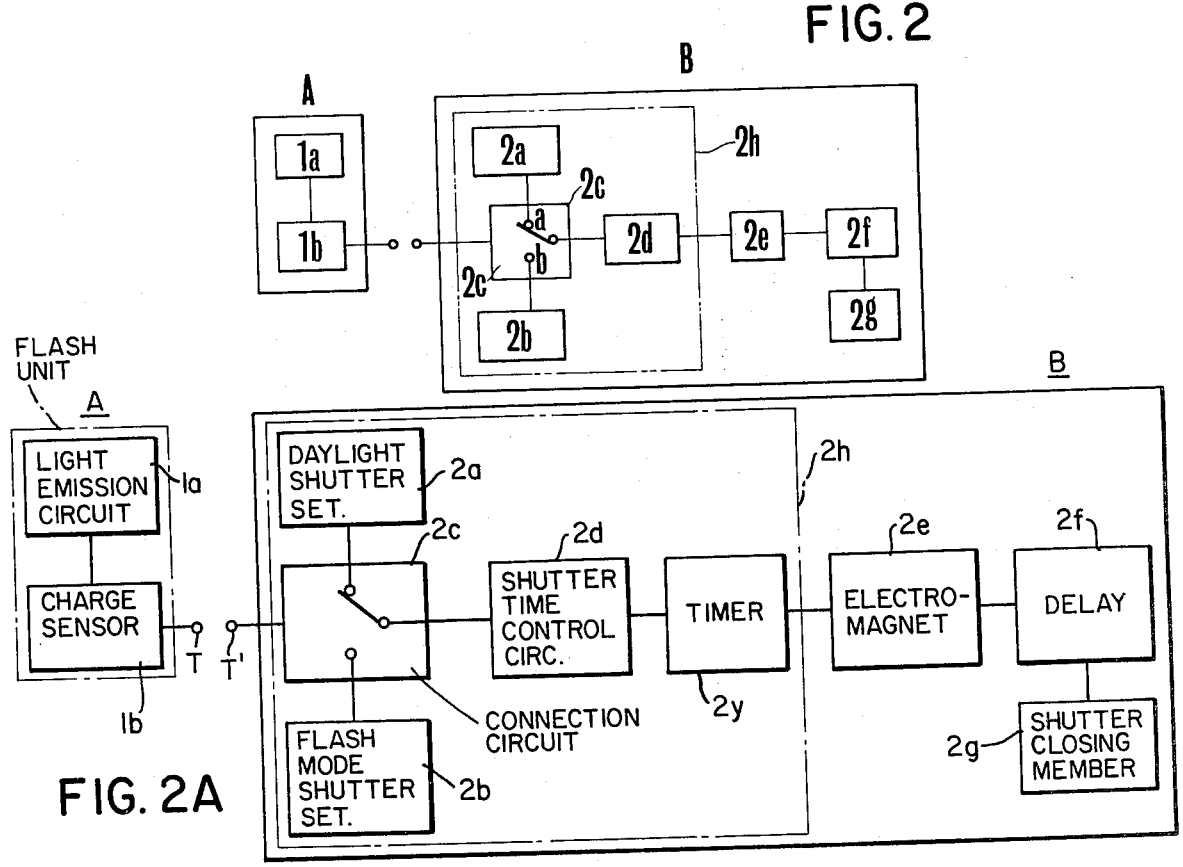
FIG. 2
FIG. 2A

FLASH CAMERA SYSTEM WITH DAYLIGHT CUTOUT CONTROL

This is a continuation of application Ser. No. 764,739 filed on Feb. 1, 1977, now abandoned.

BACKGROUND OF THE INVENTION

1. Field of the Invention

The present invention relates to a shutter time control system for flash photography of the type which automatically switches the shutter time of a camera to that to a flash made in response to a charging signal of a main capacitor.

2. Description of the Prior Art

As a system to automatically change over a shutter time of a camera to that for flash photographing (for example 1/60 second) as a photographing mode is changed over from a natural light photographing to flash photographing, such system has already been proposed that when a main capacitor for accumulation of flash light energy of a flash light device is charged to a prescribed voltage, the same is detected and the charging signal is transmitted to a shutter time control circuit of a camera from the flash light device and said shutter time control circuit is made to respond to said charging signal so that said shutter time control circuit is controlled automatically to that suited to flash photographing. But said conventional system has the shutter time control circuit changed over from the one for day light into the one for flash photographing by a charging completion signal, therefore it has such shortcomings that when the flash light device emits light while the shutter time is controlled by the shutter time control circuit for flash photographing and charging signal is eliminated, the shutter time control circuit is changed over from the shutter time control circuit for flash photographing again into the shutter time control circuit for day light, and the shutter time actually secured at a time of flash photographing receives the effect of both circuits of the shutter time control circuit for day light and the shutter time control circuit for flash photographing, thus the shutter time suited to a flash photographing can not be secured. That is, since the shutter time is changed over from the shutter time control circuit for day light to that for flash light by charging signal in a conventional flash photographing shutter time control system as mentioned above, the relationship between the output Vc of a time constant circuit to control the shutter time for flash photographing at a time of flash photographing and the shutter time t is as shown in FIG. 1. In said drawing Vs shows the threshold level of a Schmidt circuit of a known shutter control circuit which gives a shutter closing signal to such shutter closing member as a shutter follower screen etc. in response to the output of the time constant circuit, also $t_1$ shows a shutter time necessary for flash photographing while $t_2$ shows a time at which such shutter opening member as a shutter leading screen etc. fully opens an aperture part, wherein the opening member is driven by shutter release and the aperture part is fully opened at the time $t_2$. But, as a shutter time necessary for flash photographing can not be obtained if the shutter closing member is driven at said time, said threshold level Vs of the Schmidt circuit is made higher than the output of the time constant circuit at the time $t_2$, and the Schmidt circuit has not outputted a shutter closing signal yet, at said time. Also while a synchronizing contact is closed by a known method as a shutter is fully opened at the time $t_2$ and a flash tube emits flash light, the output of a main capacitor for flash light energy accumulation is lowered as the flash light is generated and said charging signal disappears. Therefore, as the shutter time control circuit is changed over from flash light to day light immediately after the time $t_2$, the output of the time constant circuit after the time $t_2$ will be controlled by shutter time information for day light, thus said conventional system has such shortcoming that if it is of a control circuit to preset a shutter time, the output of a time constant circuit varies as shown in B or C by said set shutter time, and the time reaching the threshold level will be different from the shutter time $t_1$ suited to flash photographing, such as $t_3$ and $t_4$, etc.

BRIEF SUMMARY OF THE INVENTION

An object of the present invention is to precisely conduct the control to automatically change over a shutter time of a camera to the shutter time for flash photographing by the charging signal of a main capacitor for accumulation of flash light energy of a flash light device.

Further, the present invention is to provide a shutter time control system for flash photographing which changes the shutter time automatically to that suited to flash photographing at a time of flash photographing by adding a simple element or elements to a conventional camera.

Other features and advantages of the invention will be made apparent from the following descriptions made in connection with the accompanying drawings, wherein:

DESCRIPTION OF THE DRAWINGS

FIG. 1 is a schematic graph to show the relationship between the output of a time constant circuit and shutter time in a conventional flash photographing shutter time control system.

FIG. 2 is a block diagram to show an example of a flash photographing device according to the present invention.

FIG. 2A shows another embodiment of the invention.

DESCRIPTION OF THE PREFERRED EMBODIMENTS

Figure 3:
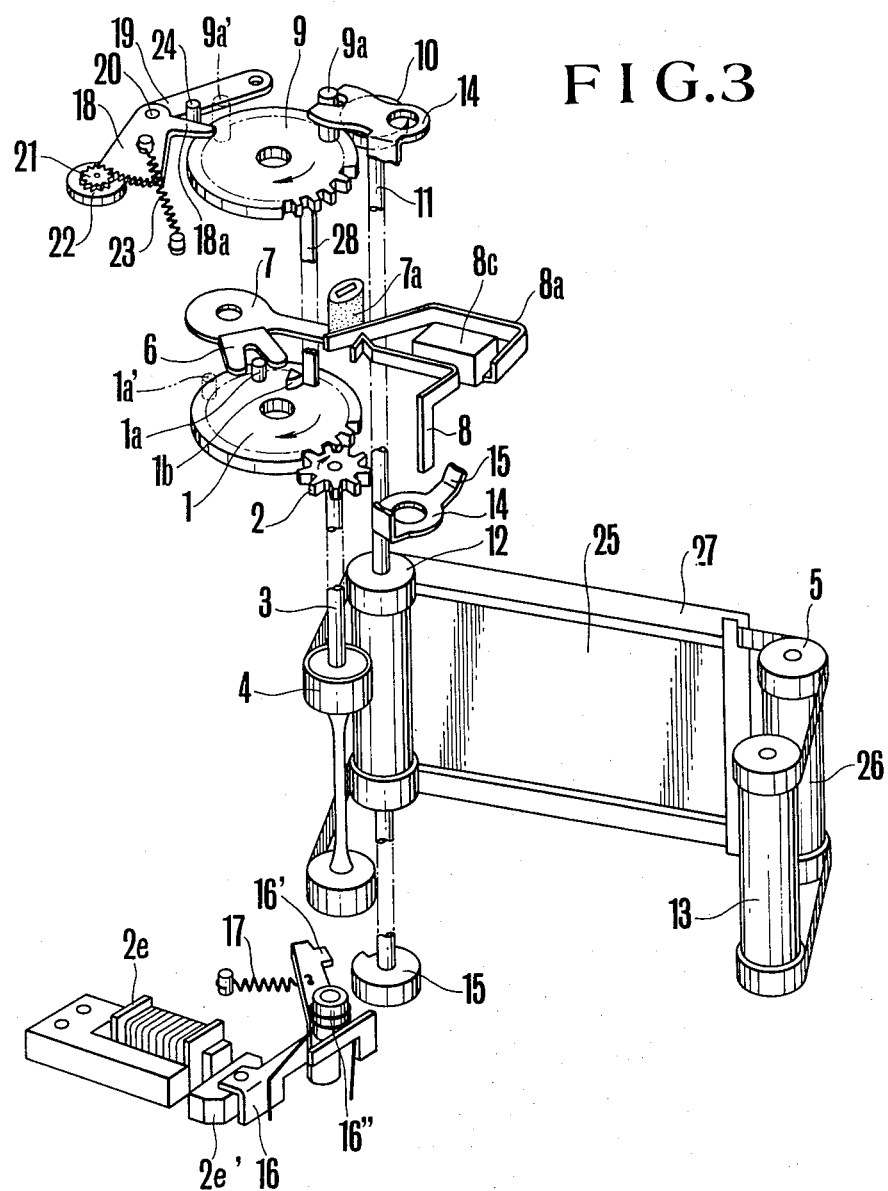
FIG. 3 is a mechanical drawing to show an example of a shutter control mechanism according to the present invention.

The present invention is to provide a flash photographing shutter time control system which is so made as being able to obtain always appropriate flash photographing shutter time even after a charging completion signal disappears by having a shutter closing signal outputted from a shutter time control circuit for flash photgraphing before a shutter is fully opened and a synchronizing contact is closed, and at a same time by providing a control means to control such period of time as elapsing from a moment said shutter closing signal is outputted till a moment a shutter closing member actually starts to close an exposure aperture.

Next, explanations will be made on a flash photographing shutter time control system according to the present invention.

FIG. 2 is a block diagram to show an example of a flash photographing device to which a flash photographing shutter time control system according to the present invention is applied, wherein A shows a flash light device, and B shows a camera part connected with said flash light device through a terminal. In the flash light device A, what is shown as a 1a shows a publicly known light emission circuit part having a flash light energy accumulation main capacitor, a trigger circuit, and a flash light discharge tube, etc., and 1b shows a publicly known charging completion detection circuit part consisting of a bleeder resistance and transistors, etc. to detect the charging state of the main capacitor and output a charging completion signal when such electric charge as sufficient to conduct a photographing with a prescribed volume of flash light is charged at said main capacitor, but since a set up of such flash light device is publicly known, the detailed explanation thereof will be omitted. And in the camera part B, what is shown as 2h is a shutter time control means, and 2a is a natural light photographing shutter time setting and inputting means, which consists of a variable resistance having its resistance value varied in an association with a shutter dial or a photo-electric conversion element, etc. of CdS, silicone photo-diode, etc. to receive object light. What is shown as 2b is a flash photographing shutter time setting and inputting means, consisting of a fixed resistance having such resistance value as corresponding to the shutter time suited for flash photography, which produces a signal corresponding to the flash time determined in view of a delay time described hereinafter. What is shown as 2c is a change over connection circuit part which changes over a switch 2c' from a contact a to a contact b in response to the charging completion signal inputted from said detection circuit part 1b into the camera part through terminals T, T' and connects a shutter time control circuit part 2d and the flash photographing shutter time setting and inputting means. Also, while the switch 2c' is shown in the drawing as said change over connection circuit part 2c, a semi-conductor switching means such as a transistor, etc. may be used as a matter of course to have said switching means conducted through by the charging completion signal from said detection circuit for securing a connection between the flash photographing shutter time setting and inputting means and the control circuit part 2d. Also the shutter time control circuit part 2d is a publicly known type of shutter time control circuit consisting of a switching circuit with a capacitor and a Schmidt trigger circuit, etc. which forms a time constant circuit together with the resistance and the photo-electric conversion element of said shutter time setting and inputting circuit 2a or 2b, and is so made as outputting a shutter closing signal after an elapse of such period of time as corresponding to the resistance value of the shutter time setting and inputting circuit after the shutter is opened, wherein the resistance value of the flash photographing shutter time setting and inputting means is so determined that the time when a shutter closing signal is generated as said flash photographing shutter time setting and inputting means 2b and said circuit are connected will be before the shutter is placed in a fully opened state. What is shown as 2e is an electro-magnetic means to respond to the shutter closing signal from the shutter time control circuit 2d for driving such known shutter closing control member as fixing member for retention of a shutter follower screen, etc. What is shown as 2f is a delay time control means to secure a delay of a prescribed period of time for a period of time from the start of the shutter closing action by the driving of the shutter closing control member by said electro-magnetic means till the shutter is driven and actually starts to cover an aperture part, and what is shown as 2g is a shutter closing member to start covering the aperture part after an elapse of such length of time as controlled by said means.

FIG. 3 is a mechanical drawing to show an example of a shutter control mechanism applied to a flash photographing shutter time control system according to the present invention, wherein what is shown as 1 is a leading screen master gear which is engaged with a leading screen pinion gear 2 and rotates to a direction of an arrow at a time a shutter is wound up by a shutter wind up mechanism not being shown in the drawing. What are shown as 1a, 1b are pins planted on the leading screen master gear 1 and what is shown as 3 is a pinion axle of the pinion gear 2, while what is shown as 4 is a leading screen roller which is coaxially made with the pinion axle. What is shown as 5 is a leading screen spring drum and 6 is a checking member to check the pin 1a at a position shown in the drawing, while 7 is a lever rotated in an association with said checking member. What is shown as 7a is an insulating body to cover a riser part provided at one end of said lever, and what are shown as 8a, 8b, 8c are contacting pieces and an insulating member constituting a synchronizing contact, while what is shown as 9 is a follower screen master gear. What is shown as 9a is a pin planted on the follower screen master gear 9, and what is shown as 10 is a follower screen pinion gear engaged with the master gear 9, while what is shown as 11 is a pinion axle of the pinion gear 10. What is shown as 12 is a follower screen roller which is co-axial with said pinion axle 11, and what is shown as 13 is a follower screen spring drum, while what is shown as 14 is a checking member to check said pin 9a at the position shown in the drawing. What is shown as 15 is a checking claw part provided at the other end of said pinion axle 11, and what is shown as 2e is the electromagnetic means shown in FIG. 2, while what is shown as 2e' is an armature of the electromagnetic means 2e. What is shown as 16 is a fixing lever provided at said armature 2e', and what is shown as 17 is a spring to bias said lever 16 with the rotating power to counter-clockwise direction, while what is shown as 18 is a sector gear. What is shown as 19 is a lever coupled with said sector gear 18 with an axle 20, and the sector gear 18 is so coupled with the lever 19 as being able to rotate around the axle 20. What is shown as 21 is a gear engaged with the sector gear 18, and what is shown as 22 is a fly wheel being integrally made with said gear 21. The pin 1a planted on the leading screen master gear 1 and the pin 9a planted on the follower screen master gear 9 are at the positions 1a', 9a' shown by broken lines respectively in a state of shutter charge. What is shown as 23 is a spring to give a rotation to counter-clockwise direction to said sector gear 18, and what is shown as 24 is a fixing pin, and said lever 19, sector gear 18, gear 21, fly wheel 22 and spring 23 constitute the delay time control means of FIG. 1. What is shown as 25 is a shutter follower screen spanned between said follower screen roller 12 and the follower screen spring drum 13, and what is shown as 26 is a shutter leading screen spanned between the leading screen roller 4 and the leading screen spring drum 5, while what is shown as 27 is a shutter leading screen ribbon. What is shown as 28 is a charging member planted on the follower screen master gear 9 which engages with the pin 1b planted on the leading screen master gear 1 by charging action to charge the same.

Figure 4:
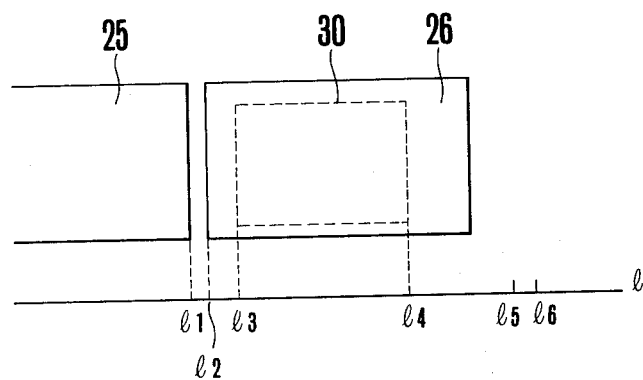
FIG. 4 is a schematic diagram to show the positional relationship between the shutter screens and the aperture in FIG. 3.
Figure 5:
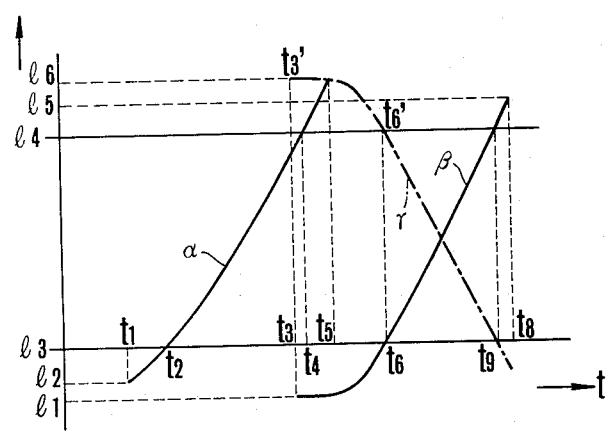
FIG. 5 is a schematic diagram to show a positional relationship between the shutter screens and the aperture in FIG. 4 and the relationship between that and a shutter functioning time.

FIG. 4 is a schematic diagram to show the positional relationship between the shutter screens and the aperture shown in FIG. 3, wherein what is shown as 30 is an aperture part, and what is shown as 26 is a shutter leading screen, while what is shown as 25 is a shutter follower screen. FIG. 5 is a schematic diagram to show the positional relationship between the shutter screens and the aperture of FIG. 4 and the relationship between that and the shutter functioning time, wherein ordinate shows the position of FIG. 4, and abscissa shows the elapse of time from release till the shutter is closed, and $\alpha$ shows the function of the shutter leading screen, while $\beta$ shows the function of the shutter follower screen, and $\gamma$ shows that of the lens shutter.

Next, explanations will be made on the function of a flash photographing shutter time control system according to the present invention referring to FIGS. 2, 3, 4 and 5.

Now, when the flash light device A is mounted on the camera B as shown in FIG. 2 and as the main capacitor of the flash light device is charged to a prescribed voltage, the detection circuit 1b outputs the charging completion signal and said charging completion signal is transmitted to the change over connection circuit 2c through the terminals T, T', then the switch 2c' is changed over from the contact a to the contact b, thus the flash photographing shutter time setting and inputting means 2b is connected to the shutter time control circuit 2d. Also at this time if the shutter has been charged at this time the shutter control mechanism of the camera will be placed in such state that the leading screen master gear 1 and the follower screen master gear 9 shown in FIG. 3 are rotated to the direction of arrow from the state shown in said drawing, and the pins 1a, 9a on each one of these gears are located at the positions 1a', 9a' shown by broken lines. The armature 2e' is attracted by an electro-magnetic means 2e and the fixing lever 16 is rotated around the axle 16'' to clockwise direction and engages with the checking member 15 by its one end 16'. Moreover, the leading screen and the follower screen are wound around the rollers 4 and 12. When a release button not being shown in the drawing is pressed down in this state, the engagement between the leading screen fixing member not being shown in the drawing and the master gear 1 is released and the leading screen spring drum 5 starts rotation, and the shutter leading screen 26 wound around the leading screen roller 4 starts running, while the rear end part of the leading screen starts to shift from the shutter charge position $l_2$ shown in FIG. 4 to the direction of $l_6$. If the time at which the shutter leading screen starts running is represented by $t_1$, the position of the rear end of the shutter leading screen reaches $l_3$ at the time $t_2$ to start placing the aperture part 30 in an opened state. Also at the time $t_2$ the count switch of the time constant circuit constituting the shutter time control circuit 2d of FIG. 2 is opened by a member associated with the running of the shutter leading screen and by a known method, and the time constant circuit activated. Therefore, the control circuit 2d outputs a shutter closing signal after an elapse of such period of time as corresponding to the fixed resistance value of the flash photographic shutter time setting and inputting means 2b of FIG. 2. Since the above mentioned fixed resistance value is so set beforehand that said time will be before the time $t_4$ at which the shutter fully opens the aperture as mentioned above, the closing signal will be produced at the time $t_3$ before the time $t_4$, and the electro-magnetic means 2e becomes inactive at the time $t_3$, then the armature 2e' is released from the electro-magnetic means, while the spring 17 rotates the lever 16 rotates to a counter-clockwise, and the engagement between the checking claw member 15 and one end 16' of the lever 16 is released, thus the follower screen spring drum 13 starts rotation, and the shutter follower screen 25 starts the shifting from the position $l_1$ at the time of charging toward the direction of the position $l_6$. At the time $t_4$ the position of the rear end of the shutter leading screen reaches the position $l_4$ and the shutter leading screen reaches the position past the aperture 30. When the rear end of the shutter leading screen reaches this position, the pin 1a planted on the leading screen master gear 1 will be rotated from the position shown by broken line to the position shown by solid line and will contact the checking member 6 and rotate the lever 7 clockwise. The insulating part 7a at forward end of the lever 7 has the contacting pieces 8a and 8b, forming the synchronizing contact pressure contact each other, thus triggering the flash light discharge tube of the light emission circuit part 1a of the flash light device of FIG. 2 by a known method to generate a flash. Therefore, the electric charge accumulated at the main capacitor is consumed, and the terminal voltage of the main capacitor is lowered, then the charging completion signal which has been outputted from the detection circuit 1b disappears at said time, while the switch 2c' is switched from the contact b to the contact a, therefore, the shutter time control circuit 2d and the natural light photographing shutter time setting and inputting means are connected to each other. And since the electro-magnetic means 2e has already been activated at the time $t_4$ as mentioned above, even if the natural light photographing shutter time setting and inputting means is connected with the shutter time control circuit, said means has been placed in such state as not being able to control at all the time of the running of the shutter follower screen. Also, while the shutter follower screen 25 has already started to run at the time when the rear end of the shutter leading screen reaches the position $l_4$, the pin 9a on the master gear 9 is in contact with one end 18a of the sector gear 18, therefore, the rotation of the master gear 9 to counter clockwise direction in an association with the running of the shutter follower screen is controlled by a governor consisting of the gear 18, the gear 21, the fly wheel 22, and the spring 23, therefore the running of the shutter follower screen receives control, thus the forward end of the shutter follower screen does not reach the position $l_3$ at the time $t_4$, therefore, the aperture is in a fully opened state at the time $t_4$ and a flash is produced by the flash unit A, while the pin 9a on said follower screen master gear 9 comes to a state over-riding one end 18a of the sector gear 18 at the time when the forward end of the shutter follower screen reaches the position $l_3$ at the time $t_6$, and the control by the governor is released, thus the shutter follower screen runs to the position $l_5$ at the same speed as the running speed of the shutter leading screen, and the aperture part is covered, thus exposure is completed. That is, in this example, the rear end of the shutter leading screen passes through the aperture part placing the synchronizing contact in ON state, and shutter closing signal is generated from the shutter time control circuit before the flash light device generates flash light, and at a same time the length of time which begins at the start of running of the shutter follower screen and ends the moment the forward end of the shutter follower screen reaches the aperture is delayed by the governor, and the time interval from the moment the leading screen starts running till the moment the same screen starts covering the aperture is made as the delay time by the shutter time control circuit plus the delay time by the governor, thus eliminating the above mentioned shortcoming. Also while the time interval from the moment the shutter closing signal is produced till the moment the shutter follower screen starts covering the aperture part is controlled by the governor in said example, even if said governor is not used, the delay action by the shutter mechanism can naturally be used by making the inertia of the follower screen spring drum and the follower screen roller, etc. great or by utilizing the response characteristics of the mechanism in the set up of the shutter mechanism itself such as the time interval from the moment the shutter closing time is outputted till the moment the engagement between the follower screen fixing lever and the checking claw is released, etc., for providing said delay time.

Also while said example shows a case of a focal plane shutter, in a case of a lens shutter, the effect of the present invention can be obtained in an entirely similar manner by making the shutter opened with such relationship as shown by α of FIG. 5 as in the above mentioned example until the shutter is placed in an opened state, and generating the shutter closing signal at the time $t_3'$ as shown by γ for the shutter closing action, further by delaying the length of time from the time $t_3'$ to the time $t_6'$ by a governor and a shutter mechanism. According to an embodiment of the invention shown in FIG. 2A, a timer circuit 2a is provided at the output terminal of the shutter time control circuit 2d in FIG. 2 and the timer circuit is actuated by the shutter closing signal from the shutter time control circuit 2d, then the electro-magnetic means 2e is activated after an elapse of time produced by the timer circuit for driving the shutter closing member. Even if the shutter time control circuit 2d has produced the shutter closing signal before the time the shutter is fully opened, and the action of the electro-magnetic means 2e is controlled by the timer circuit after said closing signal is produced, and therefore even if the voltage of the main capacitor is lowered by flashing to eliminate the charging completion signal and the shutter time control circuit and the natural light photographing shutter time setting means are connected, the shutter time for flash photographing can be obtained as in the above mentioned example.

As has been explained in detail, a flash photographing shutter time control system of the present invention is so made that a shutter closing signal is outputted at a time of flash photographing before a shutter is fully opened and a synchronizing contact is closed, and at a same time, the length of time from the moment said signal is outputted till the moment the shutter closing member starts closing an exposure aperture after said signal is outputted is controlled by a delay means, therefore, even in a case when flash light is emitted at a time of flash photographing and the terminal voltage of a main capacitor is lowered, eliminating the charging completion signal, such shutter time as securing appropriate exposure can be always obtained, thus the invention has great effects in a flash photographing shutter time control system of such type as changing over a shutter time from a natural light photographing mode to a flash photographing mode by charging completion signal at a time of flash photographing.

Terms such as "operation controller" may be applied to the system composed of members 1, 2, 9, 10, 18-24 etc., "operation regulator" to the system composed of members 2, 9, 10 etc., and "delay means" to the system composed of members 18-24, etc., although these terms are not limited to systems with these members.

While embodiments of the invention have been described in detail, it will be evident to those skilled in the art that the invention may be embodied otherwise without departing from its spirit and scope.

What is claimed is:

1. For use with a flash unit forming a charge completion signal and with a camera forming an aperture, a shutter time control system comprising:
   A. input means for receiving a charge completion signal from the flash unit;
   B. shutter means for controlling the time during which the aperture is open, said shutter means having an opening member and a closing member as well as an operation controller for starting movement of the opening member from the aperture and the closing member in front of the aperture;
   C. control means for controlling the operation of the shutter means, said control means including:
      (i) daylight setting means for producing a first electrical signal suited for daylight operation;
      (ii) flash setting means for producing a second electrical signal corresponding to the interval between the time at which the operation controller starts to move the opening member and the time immediately before the aperture is fully exposed;
      (iii) control circuit means for starting a timing operation when the operation controller starts the opening means and forming a control signal after a lapse of time corresponding to one of the first or second electrical signals;
      (iv) selector means connected to both of the setting means and the control circuit means for normally connecting said daylight setting means to said control circuit means so that the first electrical signal is applied to the control circuit means, said selector means being connected to the input means and applying the second electrical signal of the flash setting means to the control circuit means and disconnecting the daylight setting means from the control circuit means in response to the charge completion signal;
   D. shutter operation means, said means including electro-magnetic means and connected to said shutter means for causing the operation controller to start the closing member, the electromagnetic means being electrically connected to the control circuit means so as to cause the operation controller to start the operation of the closing member in response to the control signal from the control circuit means;
   the closing member of the shutter means being connected to the operation controller so as to be moved across the aperture after the operation of the electromagnetic means by operation of the operation controller, the operation controller having a moment of inertia for delaying the movement of the closing member into the aperture until the opening member completely exposes the aperture.

2. A flash photography shutter time control system with a flash device that produces a charge completion signal, comprising:
   A. signal input means for receiving the charge completion signal from the flash device;
   B. shutter means including an opening member and a closing member as well as an operation regulator for starting movement of the opening member moving from in front of the aperture and the closing member thereafter;
   C. shutter time control means for controlling the operation of the shutter means, said means including:
      (i) a daylight photography shutter time signal forming means, said means producing a first electrical signal suited for the daylight photography shutter time;
      (ii) flash shutter time signal forming means for producing a second electrical signal corresponding to the interval between the time at which the opening means starts to run by means of the operation regulator and immediately before the total opening of the shutter;
      (iii) a shutter time control circuit means for responding to the start of the opening member and forming a control signal after a given lapse of time;
      (iv) electrical changeover means connected to the daylight photographing shutter time signal forming means and the shutter time control circuit means for applying the first electrical signal to the shutter time control circuit means, and operatively connected to the signal input means to apply the second electrical signal of the flash light photographing shutter time signal forming means to the input terminal of the shutter time control circuit means in response to the charge completion signal and to disconnect the daylight photographing shutter time signal forming means with the shutter time control circuit means;
   D. a shutter operation means, said means including an electromagnetic means for controlling the start of the closing member of the shutter means through the operation regulator, the electromagnetic means being electrically connected to the shutter time control circuit means so as to start the operation of the closing member by means of the operation regulator in response to the control signal from the control circuit means, and
   E. delay means coupled to said regulator for delaying the regulator so that the closing member does not move into the aperture until the opening member completely exposes the aperture.

3. A flash photographing shutter time control system as in claim 2, wherein the delay means includes governor means mechanically engageable with the operation regulator of the shutter means, said governor means including:
   a. an engaging member engageable with the operation regulator of the shutter means, said engaging member controlling the delay operation of the closing member by engagement and disengagement from the operation regulator; and
   b. gear means movable with the engaging member so as to form a load for delaying the movement of the closing member into the aperture till the opening member totally exposes the aperture.

4. A flash photographing shutter time control system in accordance with claim 2, wherein the control means include timer circuit means electrically connected between the shutter time control circuit means and the shutter operation means and responsive to the control signal from the shutter time control signal of the closing member by the shutter operation means is delayed for the time of the timer circuit means in order to delay the movement of the closing member into the aperture till the opening member reaches the totally opened state of the shutter.

5. A flash photography shutter time control system comprising:
   1. a flash light device including:
      (a) a light emission circuit means, said means including means to store the flash light energy for the light emission;
      (b) charge completion detection circuit means, said means being electrically connected to the light emission circuit means so as to detect charge completion and produce a charge completion signal;
   2. a camera electrically connectable to the flash light device, said camera including:
      (c) signal input means, said means having input terminals for receiving the charge completion signal from the charging completion detection circuit means to the camera;
      (d) shutter means having an opening member defining a fully open shutter position and a closing member as well as an operation regulator for starting movement of the opening and closing members so as to control the exposure by controlling movement of the opening member and the closing member;
      (e) shutter time control means for controlling the operation of the shutter means, said means including:
         (i) daylight shutter time signal forming means, said means producing a first electrical signal switch for the daylight photographing shutter time;
         (ii) flash photography shutter time signal forming means, said means producing a second electrical signal corresponding to the interval between the time at which the opening member starts to run by means of the operation regulator and the time immediately before the total opening of the shutter;
         (iii) a shutter time control circuit means having an input terminal and starting a clock operation when the operation regulator causes the opening member to run and forming a lapse of time in the control signal corresponding to the electrical signal applied at the input terminal;
         (iv) electrical changeover means for connecting the daylight photographing shutter time signal forming means and the shutter time control circuit means so that the first electrical signal is applied to the input terminal of the shutter time control circuit means and for applying the second electrical signal of the flash light photographing shutter time signal forming means to the input terminal of the shutter time control circuit means in response to the charging completion signal while disabling the connection of the daylight photographing shutter time signal forming means with the shutter time control circuit means;

(f) shutter operation means including electromagnetic means for controlling the start of the closing member of the shutter means through the operation regulator, the electromagnetic means being electrically connected to the shutter time control circuit means to cause said operation regulator to start movement of the closing member in response to the control signal from the control circuit means;

(g) delay means connected to the operation regulator of the shutter means for delaying the movement caused by the operation regulator of the closing member into the aperture after the operation of the electromagnetic means at the time of the flash photography and after the lapse of time formed by the shutter time control circuit means in accordance with the output of the flash photography shutter time signal forming means till the opening member reaches at least the totally open state of the shutter.

6. A time control system as in claim 5, wherein the delay means includes governor means mechanically connected to the operation member of the shutter means, said governor means including;

a. an engaging member indirectly engageable with the operation member of the shutter means, said member controlling the delay operation of the closing member of the disengagement from the operation member;

b. a gear means engageable with the engaging member to form a load for delaying the movement of the closing member into the aperture till the opening member reaches the totally open state of the shutter.

7. A control system in accordance with claim 5, wherein said shutter time control means includes timer means connected between the shutter time control circuit means and the electromagnetic means and responsive to the control signal from the shutter time control circuit means for delaying the electromagnetic means, the operation time of the timer means being arranged to delay the movement of the closing member by the electromagnetic means and the delay means into the aperture till the opening member reaches the totally opened state of the shutter.

* * * * *